March 4, 1941.   F. MARTI   2,233,743
RESILIENT FASTENING DEVICE FOR BEARINGS, PARTICULARLY
FOR BALANCE STAFFS OF WATCHES
Filed Oct. 31, 1938
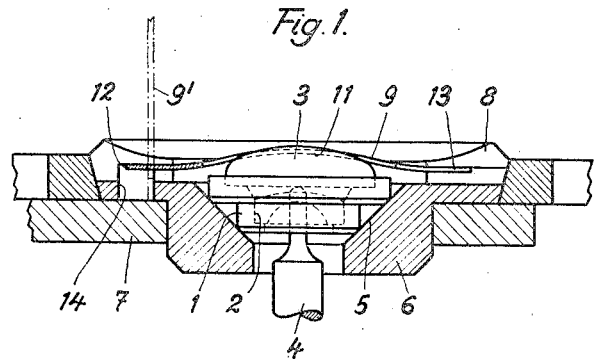
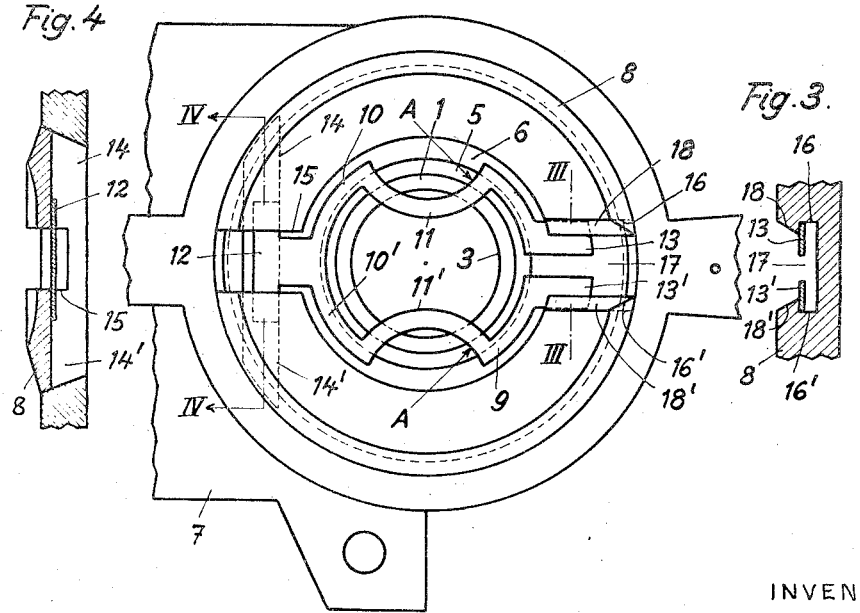
INVENTOR
FRITZ MARTI
By
Young, Emery + Thompson
ATTYS.

Patented Mar. 4, 1941

2,233,743

UNITED STATES PATENT OFFICE 2,233,743

RESILIENT FASTENING DEVICE FOR BEARINGS, PARTICULARLY FOR BALANCE STAFFS OF WATCHES

Fritz Marti, La Chaux-de-Fonds, Switzerland

Application October 31, 1938, Serial No. 238,057
In Switzerland November 8, 1937

5 Claims. (Cl. 58—140)

The invention has for its object a resilient fastening device for the cap jewels of bearings particularly for balance shafts of watches, in which a spring pressing on the bearing serves as shock absorber and in certain cases also as recentering member. This device is characterized in that the said spring is articulated to its support by means of a hinge and may be removably fastened to at least another point of said support by its own resiliency.

Devices with a view of resiliently holding fast a bearing for balance pivots have already been constructed. There are generally metallic lamellae of a more or less annular shape with resilient branches or tongues which bear against the outer surface of the cap jewel. These springs are generally pressed between a shoulder of the opening of the cock or of the cover plate carrying the bearing and an annular member pressed into this opening. Sometimes the springs are made in one piece with this annular member. But the dismounting and remounting of such devices for instance for repairs are particularly difficult and delicate. It happens often that one of these springs gets lost during dismounting or that it is put back in a wrong way to the greatest disadvantage for the watch.

The device which is the subject of the invention is intended to remedy this inconvenience.

The annexed drawing shows as an example a preferred embodiment of the invention.

Fig. 1 shows a section on the balance axis,

Fig. 2 is a plan view and

Fig. 3 is a partial section on line III—III of the Fig. 2 and

Fig. 4 is a partial section on line IV—IV of the same.

1 designates a movable jewel mounting carrying the hole jewel 2 and the cap jewel 3. This group constitutes the bearing of the pivot of the shaft 4. This setting rests freely in a conical seat 5 provided in the annular support 6 which is forced into an opening of cover plate 7 of the cock. A ring 8 which may be made in one piece with the annular support 6 carries a holding spring 9 resting on the convex outer surface of the cap stone. This spring 9 is a two-armed forkshaped flat spring, the arms 10 and 10' of which are curved inward at 11 and 11'. The portion 12 which may be called the head end of the spring is extended to the outside to form a T. The free ends of the two branches 10 and 10' are elongated forming two tongues 13 and 13'. The fastening of the spring 9 to its support, in this case to the ring 8, is effected at two points arranged symmetrically to the axis of pivot 4. On the one side the two ends of the T bar of spring 12 are lodged in transverse recesses 14—14' of square cross section provided in the ring 8 on both sides of the notch 15 into which the head of spring 12 is inserted. The T bar engaged into the recesses 14—14' may pivot therein and thus form the articulation of the spring 9. On the other side of this articulated fastening the two final tongues 13, 13' are engaged into two radial grooves 16, 16' cut into the two side walls of a second notch 17 of ring 8.

Thus spring 9 is fastened to its support at two points symmetrically arranged with respect to the pivot. One of these fastenings 14, 14' is permanent and articulated, the other 16, 16' is removable. The spring held this way is in a stressed condition and rests at 11 and 11' upon the convex surface of the cap stone 3 absorbing the shocks reserved by this pivot and tending to strongly press it to its seat on the jewel 1 which is thus always recentered in its conical seat in a case of displacement.

When disengaging spring 9 during the dismounting of the members of the bearing it suffices to press successively at A on the arms 10, 10' for disengaging their ends from the grooves 16, 16' of ring 8. Then the spring may be pivoted on its head 12 and be brought into a vertical position 9' where it may remain during all the time of repairs. To bring it again into its place it suffices to bring it down unto the cap stone and to press successively upon each of the arms 10, 10' to reengage the arms into the grooves 16, 16'. A slight bevelling at 18, 18' of the edges of notch 17 facilitates this operation by directing the pressure exerted against its two arms into the plane of the spring.

The spring may assume other forms and bear against the bearing at more than two points.

The hinge may be attached afterwards. It may also be constituted of two trunnions integral with the support and pivoted in a recess of the head of the spring. Finally the ring-shaped support of the spring may form a single piece with the support of the bearing and could be constituted of any piece having a circular opening such as the flat part of a cock cover-plate or index plate.

What I claim is:

1. A resilient fastening device for the cap jewels of bearings for balance staffs of watches, comprising a bearing support, an annular spring support having shoulders carried by the bearing support, a cap jewel-engaging spring held by said support, one end of said spring being permanently and pivotally attached to one side of the spring support so as to be able to be pivoted only in a plane perpendicular to the plane of said support and the other end of the spring being removably secured to the other side of the spring support by means of its own resiliency in addition to the shoulders of the support.

2. A resilient fastening device for the cap jewels of bearings for balance staffs for watches, comprising a bearing support, an annular spring support having shoulders carried by the bearing support, a cap jewel-engaging two-armed fork-shaped flat spring, the head portion of which is permanently and pivotally attached to one side of the spring support so as to be able to be pivoted only in a plane perpendicular to the plane of said support and the free ends of the arms of which are removably secured to the other side of the spring support by means of their own resiliency in addition to the shoulders of the support.

3. A resilient fastening device for the cap jewels of bearings for balance staffs of watches, comprising a bearing support, an annular spring support having shoulders carried by the bearing support and having a radial notch provided with transverse recesses on both walls, a cap jewel-engaging two-armed fork-shaped flat spring, the head portion of which has a T-shaped outward extension hingedly engaged in the transverse recesses of said radial notch, the free ends of the arms of said spring being removably secured to the other side of the spring support by means of their own resiliency in addition to the shoulders of the support.

4. A resilient fastening device for the cap jewels of bearings for balance staffs of watches, comprising a bearing support, an annular spring support carried by the bearing support and having two diametrically opposite radial notches the first of which is provided with transverse recesses on both side walls while the second is provided with longitudinal grooves cut into its side walls, a cap jewel-engaging two-armed fork-shaped flat spring, the head portion of which has a T-shaped outward extension hingedly engaged in the transverse recesses of the first notch, the free ends of the arms of said spring being engaged in the grooves of the second radial notch of the support.

5. A device as claimed in claim 4, in which the two arms of the fork-shaped spring at their median part have curved-in portions engaging the cap jewel at least at two points symmetrically arranged with respect to the axis of the bearing.

FRITZ MARTI.